R. SEDGWICK.
TRACTION WHEEL.
APPLICATION FILED MAR. 25, 1912.

1,039,200.

Patented Sept. 24, 1912.

3 SHEETS—SHEET 1.

R. SEDGWICK.
TRACTION WHEEL.
APPLICATION FILED MAR. 25, 1912.
1,039,200.
Patented Sept. 24, 1912.
3 SHEETS—SHEET 2.
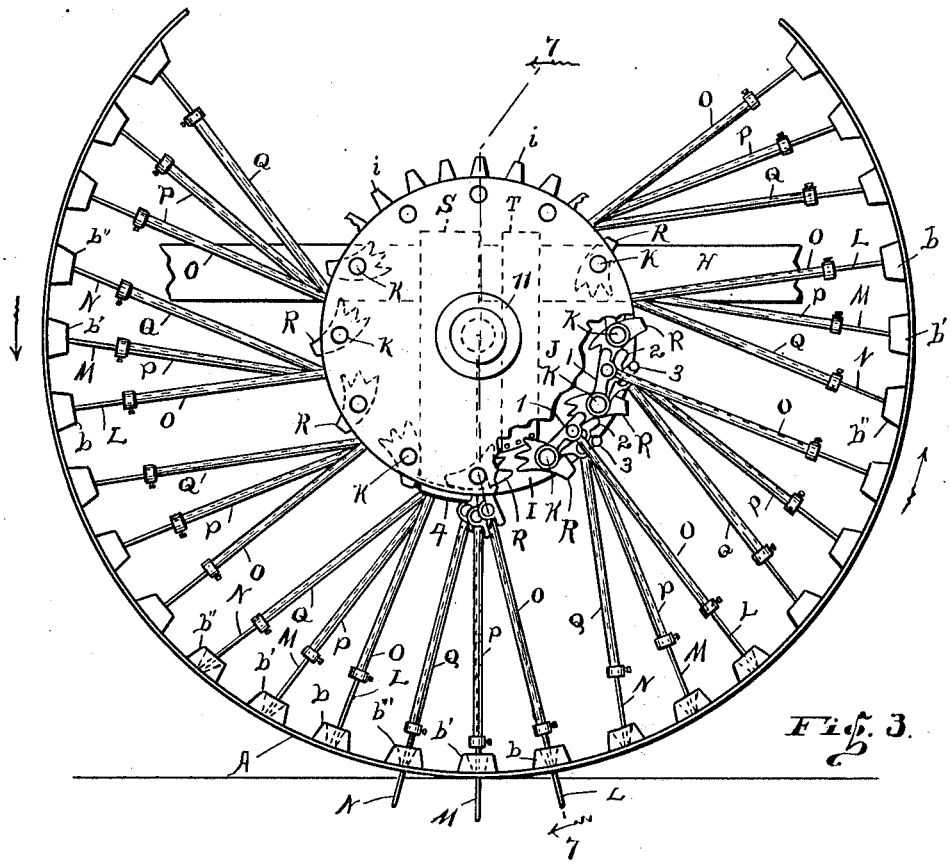
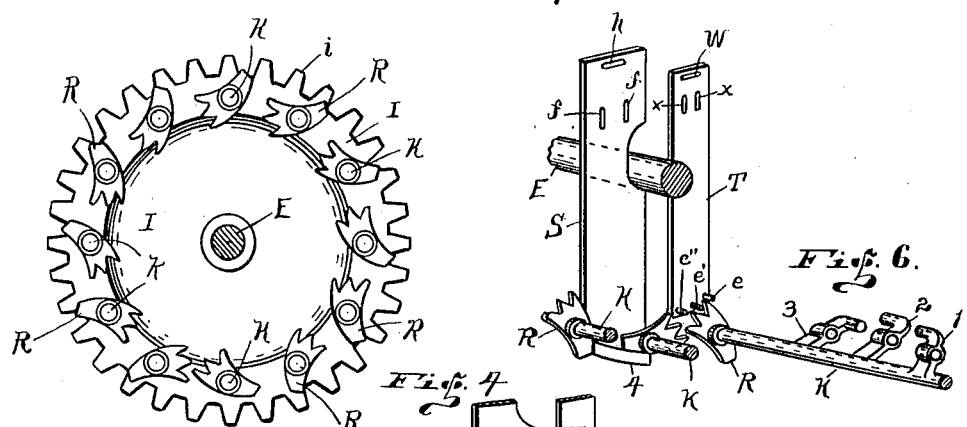

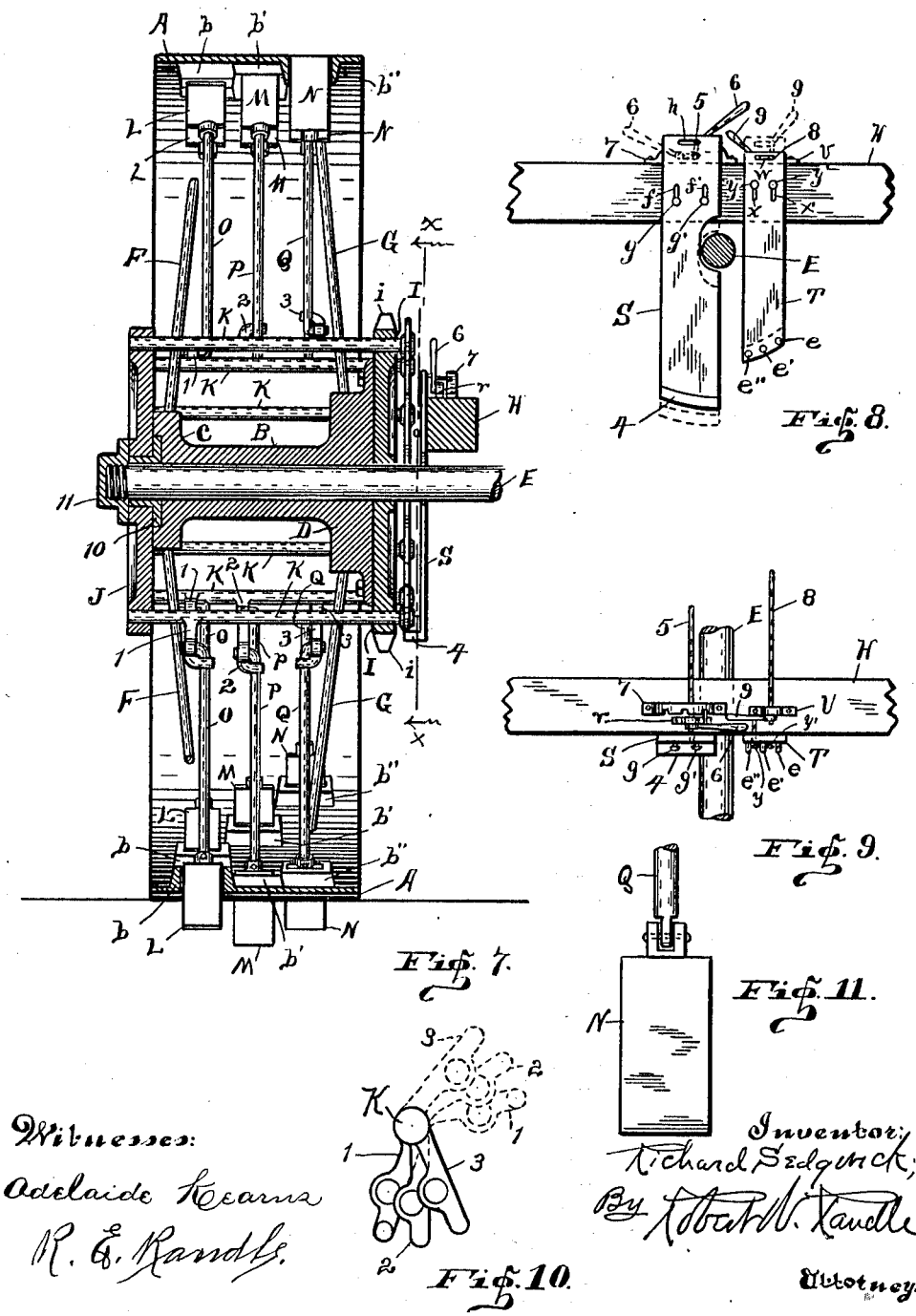

United States Patent Office.

RICHARD SEDGWICK, OF RICHMOND, INDIANA.

TRACTION-WHEEL.

1,039,200.

Specification of Letters Patent.

Patented Sept. 24, 1912.

Application filed March 25, 1912. Serial No. 686,053.

*To all whom it may concern:*

Be it known that I, RICHARD SEDGWICK, a citizen of the United States, residing in the city of Richmond, in the county of Wayne and State of Indiana, have invented a new and useful Construction in Traction-Wheels, of which the following is a full, clear, and comprehensive specification and exposition, being such as will enable others to make and use the same with absolute exactitude.

The object of my invention, broadly speaking, is to provide a traction-wheel which will be strong and durable in construction, easily operated and controlled, comparatively light in weight, adapted for a maximum of mechanical efficiency, and which can be manufactured and sold at a comparatively low price.

Another object is to provide a tractor wheel adapted for utilitarian purposes, being constructed in such manner as to afford a maximum of adhesion or traction when operating over or on the ground or a roadway, thereby preventing the wheel from skidding or slipping under any conditions whatever, regardless of the condition of the ground or the amount of power applied to turn the wheel.

Another object is to provide a tractor wheel in which the adhesive condition of the wheel may be changed, dispensed with, or reinstated at the will of the operator, or maintained to operate automatically as desired. And another object is to provide a tractor wheel having means for breaking up the soil for cultivation or other purposes, or for loosening up the ground in building roadways or the like, and for other analogous purposes which may present themselves.

Other objects and particular advantages of the invention may present themselves in the course of the following description, and that which is new will be correlated in the appended claims.

One manner for the construction and the arrangement of my invention, and that which in practice I have determined to be the most practical, is shown in the accompanying drawings, in which—

Figure 1:
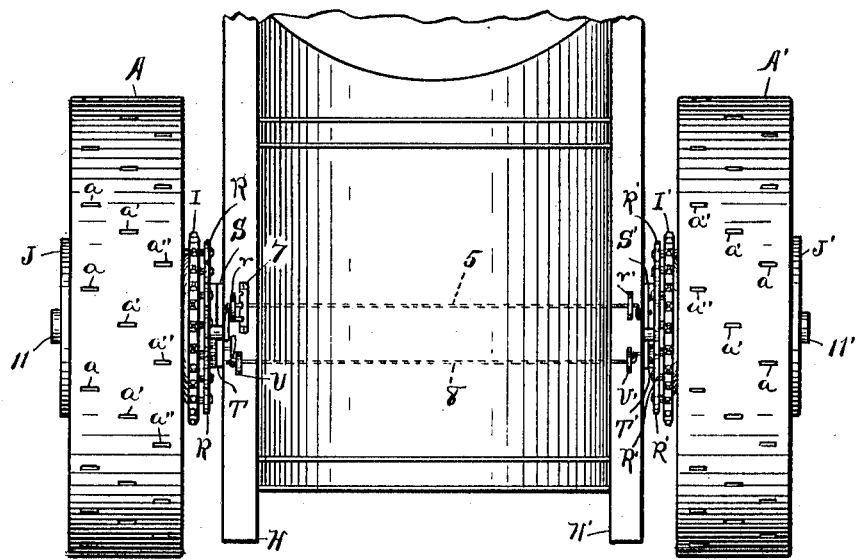
Figure 2:
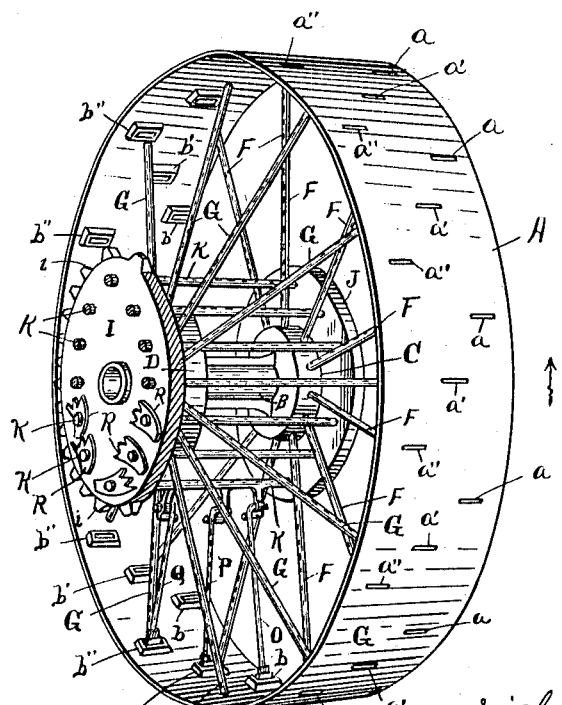

Figure 1 is a plan view showing a portion of a machine or vehicle which is supported by two wheels constructed in accordance with my invention, the two being oppositely disposed to each other. Fig. 2 is a perspective view showing the inner face of one of my wheels, same being detached from its normal connections. Fig. 3 is a front elevation of my wheel, showing same enlarged from that shown in the other views, certain parts being shown as broken away in order to show parts beyond. Fig. 4 is a face view of the inner disk, showing the arrangement of the butterflies with relation thereto. Fig. 5 is a perspective detail view showing certain operations of the butterflies. Fig 6 is a perspective detail view also illustrating certain positions of the butterflies, and the rocking shafts. Fig. 7 is a cross sectional view of my wheel, as taken in line 7—7 of Fig. 3. Fig. 8 is a detail elevation showing the cam-arm and the pin-arm, and illustrating certain movements thereof. Fig. 9 is a plan view of the parts shown in Fig. 8. Fig. 10 is an end elevation of one of the rocking shafts, showing the relative positions of the arms which are integral therewith, also showing said arms in dotted lines as in a second position. And Fig. 11 is a detail view showing a modified means for connecting the links to the blades.

Similar indices denote like parts throughout the several views of the three sheets of drawings.

In order that the construction and the operation of my invention may be more clearly understood and appreciated I will now take up a detailed description thereof in which I will set forth the invention as briefly and as comprehensively as I may.

In Fig. 1 I have shown two wheels, same being oppositely disposed with relation to each other and showing them as supporting one end of the frame which forms the body of a vehicle or machine to be carried. The duplicate parts on the right in Fig. 1 are indicated by corresponding indices with exponents added thereto.

In the drawings letter A denotes the peripheral rim of my wheel, same having a plurality of horizontal or crosswise apertures, $a$, $a'$ and $a''$ formed therethrough, same being arranged in trio extending diagonally across the rim, substantially as indicated.

The hub of my wheel comprises the central, tubular, portion B, the outer end flange C, and the inner end flange D, the three parts being formed integral with each other, substantially as indicated. Letter E denotes the main shaft, or stationary axle, on which the said hub is revolubly mounted, being concentric therewith.

Connecting the rim A with the flange C is a plurality of equidistant spokes F; and in like manner connecting the rim A with the flange D is a plurality of equi-spaced spokes G. The spokes F are arranged alternately with the spokes G, and all of the spokes are rigidly secured at their termini in any manner. Mounted over the shaft E, between the wheels A and A', is a frame including the respective side-rails H and H' which are the only parts thereof material to an understanding of this invention. Rigidly secured to the face of the flange D is the disk I, on the periphery of which is formed the sprocket $i$ over which may operate a sprocket-chain (not shown) by which the prime mover is connected to revolve the wheel. Said disk I should be of greater diameter than is the flange to which it is secured. Secured to the face of the flange C is the disk J which corresponds in size but is oppositely disposed to the disk I, the two disks being spaced apart as shown. Rotatably mounted in and extending across between the disks I and J is a plurality of equi-spaced rocker-shafts K, same extending across and disposed between the spokes F and G, substantially as shown. Formed integral with each rocking-shaft K is three arms which are denominated by numerals 1, 2, and 3, same being placed an equal distance apart along the length of said shaft K, but they are positioned at different angles with relation to each other, but all project from one side of the shaft K, that is from one side of a line drawn centrally therethrough at right angles thereto. The central arm 2 is made slightly longer than are the arms 1 and 3, for the purpose which will hereinafter be made apparent. An eye is formed in the outer or end portion of each of said arms, and the point thereof beyond said eye is turned at right angles to the body forming a hook, for the purpose hereinafter appearing.

As before intimated there are a plurality of trios of slots formed through the rim A, the members of each trio being designated by indices $a$, $a'$ and $a''$, same being arranged diagonally as shown. Formed around each of said slots, integral with the inner periphery of the rim A, and extending inward toward the hub, is a hollow guide-block, same being designated by $b$, $b'$ and $b''$, respectively, each forming an inward prolongation of the slot. Slidably mounted in the slots $a$, $a'$ and $a''$, and in the corresponding guide-blocks $b$, $b'$ and $b''$, are the blades L, M and N. Connected to the inner end of the blades L, M, and N, are the links O, P, and Q, respectively. The inner end portion of each of said links is turned at right-angles to the body portion thereof and they are inserted in the said eyes of the respective arms 1, 2 and 3, all substantially as shown. Secured on the inner end of each rocking-shaft K is a butterfly R, same being formed segmental and tapering from one end toward the other, and in the larger end thereof is formed teeth which are for the purposes hereinafter appearing. Slidably mounted on the face of the rail H and adapted to be moved up and down for adjustment, is the cam-arm S, carrying on its lower outer face and extending thereacross at an angle and in a curve, the cam 4 which is adapted to engage the sides of the butterflies R, as shown in Figs. 5 and 6 for instance. Also slidably mounted to the face of the rail H, located near the cam-arm S, and adapted to be moved up and down for adjustment, is the pin-arm T. Extending out from the lower portion of the arm T are the pins $e$, $e'$, and $e''$, which are adapted to engage between the teeth formed in one end of the butterfly R, as shown in Fig. 6. Formed in the upper portion of the cam-arm S are two vertical slots, $f$ and $f'$, in which may operate the headed pins $g$ and $g'$, which are secured in the rail H, thereby allowing the arm S to be raised and lowered within the limits of said slots. Formed across through the upwardly projecting end portion of the bar S is the slot $h$.

Numeral 5 denotes a shaft extending across the frame and supported by the hangers $r$ and $r'$, said hangers being located on top of the respective rails H and H'. Each end of the shaft 5 is offset forming eccentrics or cranks which are inserted in the horizontal slots $h$, whereby when the shaft 5 is rotated the arm S will be raised or lowered.

Numeral 6 denotes a lever secured to shaft 5, by which the said shaft may be operated to raise and lower both of the arms S and S' together. The said lever being adapted to be secured at various angles in the rack 7.

Numeral 8 denotes a shaft which extends across the frame and it is supported by the hangers $v$ and $v'$ which are secured on top of the rails H and H'. Each end of shaft 8 is offset forming eccentrics or cranks which are located in the horizontal slots $w$, whereby when the shaft 8 is rotated by the lever 9, which is secured thereto, the arm T will be raised and lowered.

Formed through the upper portion of arm T are the two vertical slots $x$ and $x'$ in which may operate the headed pins $y$ and $y'$ which are secured in the rail H.

The wheel is retained revolubly in place on the shaft E by means of the collar 10 and the cap 11, as shown in Fig. 7: the former being secured around the shaft E, the flange portion thereof being let in flush with the face of the flange C, and the other portion thereof being extended to form the hub filling the central aperture of the disk J. The cap 11 is threaded on the end of shaft E and it engages the central portion of the face of the disk J. By the above mentioned arrangement it will be seen that when the wheel revolves that the disk J will turn between the flanges of the collar 10 and the cap 11, thereby permitting the wheel to revolve freely but preventing it from moving laterally on shaft E.

It is to be understood that by securing the lever 6 at various points within its limit of movement that any degree of projection may be given to the blades, and when so projected the lever may be locked whereby they will thereafter, until the lever is changed, continue to be projected to the degree to which they are geared without further attention on the part of the operator. In fine I desire that it be understood that the blades may not only be retained to project outward to their limits or entirely inward but that they may be geared to project to any desired distance within their limits, in order to meet various conditions.

I would also have it understood that I am not to be limited to the shape of the blades shown, neither am I to be limited to blades, but I am to be allowed to use spikes or pins in place of the blades in which case round or other shaped apertures would be formed through the rim to conform to the shape thereof in cross section.

In practice the wheel may be revolved on or over the ground in the usual manner supporting, with its consort, the frame of the truck the sills H and H' traveling along parallel to the ground. If one so desires the wheel may be caused to have a smooth tread, in which case all of the blades should be drawn in and remain so in order that they may not engage the ground, as indicated by the three lower blades in Figs. 3 and 7. To obtain said result the levers 6 and 9 should be turned to the left and to the right, respectively, as shown by the dotted lines in Fig. 8, thereby lowering the cam 4 and raising the pins $e$, $e'$ and $e''$ in order that they will be out of engagement, or engaging position, with relation to the butter flies. Desiring now to cause the blades to engage in the ground, that is to assume the positions shown in Figs. 3 and 7, one has only to turn the levers 6 and 9 to their positions shown in Fig. 8, thereby raising the cam 4 so that as each butterfly engages thereagainst it will be turned to the position shown by the center butterfly in Fig. 6, and it will be retained in that position until it has left the cam, thereby turning the rocking shaft K and causing the arms thereof to force the respective blades outward as shown, and holding them out until the butterfly has left the cam, immediately after which the butterfly will engage the pins $e$, $e'$, and $e''$ in succession thereby turning the shaft K and drawing the blades inward to their normal positions.

I desire that it be understood that I am not to be limited to the precise details of construction herein set forth, but that various changes may be made in the several details of construction without departing from the spirit of my invention or sacrificing any of the advantages thereof.

Having now fully shown and described my invention and the best manner for its construction to me known at this time, what I claim and desire to secure by Letters Patent of the United States, is—

1. A traction wheel having a relatively broad rim with slots formed therethrough in sets arranged diagonally across the rim and each set being equi-distant from the ones next thereto, a blade slidable in each of said slots, a hub, disks secured to the ends of the hub, spokes extending from the ends of the hub to the rim, a plurality of rocking-shafts extending across between and pivoted in said disks, fingers formed on each of said rocking-shafts, a rod connecting each of the fingers to one of said blades, and means for rotating each of said rocking-shafts in succession to move said blades in and out, all substantially as shown and described.

2. A traction wheel having a rim, a hub, spokes rigidly connecting the rim and the hub, disks secured to the inner and the outer ends of the hub, rocking shafts extending across longitudinally of the hub and having their end portions pivoted in said disks, a butterfly secured on the inner projection of each rocking-shaft, a relatively stationary cam adapted to engage each of the butterflies in succession and thereby turn the rocking-shafts, means for turning the rocking-shafts back to normal position, arms extending out from each rocking shaft, a rod pivoted to each of said arms, and a blade connected to the outer end of each of said rods, each of said blades being adapted to operate through the rim, all substantially as shown and described and for the purposes set forth.

3. A tractor wheel having a rim with slots formed therethrough, a hub, spokes connecting the rim and the hub, a blade slidable in and out in each of said slots, disks secured on the inner and outer ends of said hub, a plurality of rocking-shafts extending between and pivoted in said disks, a butterfly rigidly secured on the inner projecting end of each rocking-shaft, a relatively stationary cam adapted to engage each butterfly in succession as the wheel revolves and turn the rocking-shaft attached thereto, pins for engaging each butterfly as it leaves the cam to turn the shaft back to normal position, arms extending from each of said rocking-shafts, a link pivoted to each arm, the outer end of each link being attached to one of said blades, all substantially as set forth.

In testimony whereof I have hereunto subscribed my name to this specification in the presence of two subscribing witnesses.

RICHARD SEDGWICK.

Witnesses:
 ROBT. W. RANDLE,
 R. E. RANDLE.

Copies of this patent may be obtained for five cents each, by addressing the "Commissioner of Patents, Washington, D. C."